United States Patent [19]
Kückens

[11] Patent Number: 4,936,110
[45] Date of Patent: * Jun. 26, 1990

[54] METHOD AND ARRANGEMENT FOR WITHDRAWING HEAT FROM A SPACE WHICH IS EXPOSED TO A NATURAL HEAT INFLUENCE

[75] Inventor: Alexander Kückens, Reinfeld/H, Fed. Rep. of Germany

[73] Assignee: Technica Entwicklungsgesellschaft mbH & Co. KG, Ratzeburg, Fed. Rep. of Germany

[*] Notice: The portion of the term of this patent subsequent to Jun. 26, 2003 has been disclaimed.

[21] Appl. No.: 271,126

[22] Filed: Jun. 8, 1981

[51] Int. Cl.$^5$ .............................. F25D 23/12
[52] U.S. Cl. .............................. 62/260; 165/45
[58] Field of Search ............ 62/324.1, 260, 238.6; 165/45

[56] References Cited

U.S. PATENT DOCUMENTS

| | | | |
|---|---|---|---|
| 2,722,107 | 11/1955 | Gay | 62/260 X |
| 3,965,972 | 6/1976 | Petersen | 165/45 |
| 4,008,709 | 2/1977 | Jardine | 165/45 X |
| 4,094,167 | 6/1978 | Madsen | 62/238.6 |
| 4,134,273 | 1/1979 | Brautigan | 62/260 |
| 4,165,036 | 8/1979 | Meckler | 62/238.6 X |
| 4,173,125 | 11/1979 | Bradshaw | 62/238.6 X |
| 4,215,551 | 8/1980 | Jones | 165/45 X |
| 4,237,963 | 12/1980 | Girard | 62/260 X |
| 4,240,268 | 12/1980 | Yuan | 62/260 |
| 4,248,049 | 2/1981 | Briley | 165/45 X |
| 4,299,277 | 11/1981 | McGregor | 62/260 X |
| 4,325,228 | 4/1982 | Wolf | 62/260 |
| 4,327,560 | 5/1982 | Leon et al. | 62/324.1 |
| 4,375,831 | 3/1983 | Downing, Jr. | 62/260 X |

FOREIGN PATENT DOCUMENTS

| | | | |
|---|---|---|---|
| 487762 | 7/1918 | France | 62/260 |
| 2395466 | 2/1979 | France | 62/324.1 |

Primary Examiner—Lloyd L. King
Attorney, Agent, or Firm—Barnes, Kisselle, Raisch, Choate, Whittemore & Belknap

[57] ABSTRACT

Structure for and method of cooling or heating a space which is exposed to a natural heat influence. The structure includes a first fluid store buried in the ground so as to be at the temperature of the surrounding earth, a heat exchanger positioned in a space to be cooled and means for passing a fluid between the first fluid store and heat exchanger in a closed circuit. The structure of the invention may also include heat units for the space and hot water heaters connected in the closed circuit between the heat exchanger and first fluid store and a heat pump connected between the heat units and water heaters and the closed circuit. In a further embodiment of the invention, a second fluid store is provided in conjunction with the heat exchange structure which may also be buried so that waste heat may be utilized to heat the fluid in the second fluid store. Further structure may be provided in accordance with the invention for utilizing roof heat to augment the heat of the heat pump and structure may be provided for regulating the moisture in the earth around the fluid stores. The method of the invention includes passing a fluid between a buried fluid store and a heat exchanger in a space to be cooled, passing the fluid from the heat exchanger through heating units of a space to provide space and/or hot water heating and assisting the heating with a heat pump.

6 Claims, 6 Drawing Sheets

METHOD AND ARRANGEMENT FOR WITHDRAWING HEAT FROM A SPACE WHICH IS EXPOSED TO A NATURAL HEAT INFLUENCE

The invention relates to a method and to an arrangement for withdrawing heat from a space exposed to a natural heat effect or influence, subject to the use of fluid stores and heat exchangers of an air conditioning system.

For the purpose of cooling spaces, e.g. when there is strong irradiation from the sun, to an agreeable temperature, it is necessary to use an air conditioning plant which is elaborate and expensive and which entails a high consumption in energy. In the case of spaces used for commercial purposes, e.g. in the case of greenhouses or conservatories, elaborate hinge-mounted swivelable plates are necessary—these plates being of large surface area and being associated with expensive and cumbersome actuating devices—for protecting the plants, treated in the greenhouse, from being overheated due to the irradiation from the sun. Since ventilation (aeration) systems for this purpose react in a highly insensitive manner to the measurement data of thermostats, automatically controlled aeration systems have not been found to be satisfactory for use with greenhouses. The ventilation or aeration systems have therefore had to be continuously supervised by personnel. Also, high energy costs have been experienced, in dwelling houses or the like, for cooling the foodstuffs stored in the house—large quantities of these foodstuffs being frequently stored in the house—or for maintaining these foodstuffs in frozen condition.

In the case of all these systems it is difficult to render the heat withdrawn during the cooling operation, reusable, as it is difficult to store this heat (or the known systems for recovering the heat are themselves very expensive).

Underlying this invention is the object of providing a method, and also an arrangement for carrying out the method, of reliably maintaining, with sufficient accuracy, a predetermined temperature is spaces exposed to a natural heat effect or influence, subject to the use of fluid stores and heat exchangers, entailing only low installation costs and only low energy consumption, this predetermined temperature being thus maintained even when the natural effects or influences to which the said spaces are exposed fluctuate markedly (insofar as possible the heat thus obtained is to be used in a simple and energy-saving way).

According to the invention this object is achieved through the fluid being guided, in the closed circuit, through a first fluid store and, in this first fluid store, being cooled to approximately ground temperature through direct heat exchange with the ground; subsequently the fluid is guided through the heat exchanger and, during this process, receives heat from the space.

This process can, in an advantageous manner, be used for operating a cool space, e.g. of a dwelling house, this cooling space being accessible and serving for storage of the foodstuffs or the like, the fluid, which is guided in the closed circuit in this cooled space, being cooled, in the first fluid store, to a temperature which approximately corresponds to the ground temperature in the vicinity of this first fluid store and, through the fluid guided in the circuit, the said cool space, which can be entered, is maintained at a temperature approximately equal to this ground temperature. The cool space may be of any desired size, as adequate cooling capacity is available in the first fluid store in conjunction with the ground (earth) area which is in thermal contact with the fluid store. Since, at only relatively small depths in the ground or earth, the ground temperature barely fluctuates, taken on a yearly average, and for example lies within the range between 4° and 6° C., it is possible—solely through circulating the fluid in a closed circuit between the heat exchanger in the cooled larder and the fluid store in the ground or earth—to maintain, with sufficient accuracy, the desired low temperature in the larder even when the natural heat penetrating into the larder is subject to large fluctuations. It is not even necessary to insulate, with respect to the outside, the larder in the vicinity of the walls or doors, as adequate cooling capacity is available for removing the heat which penetrates. There may be provided, in a wall of the pantry (larder) and behind a hinge-mounted plate or panel, a special cooled compartment for cooled goods, which should be mainly available for rapid access by the housewife. A refrigerator or deep freeze cupboard of conventional type nay be arranged in the pantry; the heat delivering part of the cooling unit is preferably directly cooled by the fluid flowing in the circuit.

The method can be employed, in a similarly simple and energy-sparing manner, for cooling dwelling spaces of a dwelling house in the form of an air conditioning system. In this case, also, any desired low, prescribed temperature can be set simply through the fluid flowing, in the circuit, between the first fluid store, held in contact with the ground, and the heat exchangers positioned in the dwelling spaces. Preferably, the heat exchangers are constituted by heating coils or radiators which are already present in the dwelling spaces and which serve for heating these spaces. In this way the installation expenses are quite markedly reduced. An air fan can be provided for cooperation with the dwelling spaces and with the tubular heating coils for the purpose of increasing thermal exchange between the air in these dwelling spaces and these tubular heating coils, this blower (fan) ensuring forced convection of the air both during the heating period and also during the cooling period.

The method, and the arrangement, provided for carrying out this method, can also be used, with great advantage, in conjunction with the conventional heating systems of greenhouses, so as to render unnecessary the hitherto necessary ventilation systems for withdrawing excess heat from the greenhouses. To this end the radiators or the like arranged in the greenhouses are heating bodies to which, again, fans are, conveniently, allotted, and are connected, by way of the closed circulation system, to the first fluid store in the ground so that the fluid, after it has been cooled in the first fluid store to the low temperature of the surrounding ground can be fed, through the forced circulatory system, to the heating bodies or radiators in the greenhouse. There the fluid receives the excess heat reliably and with great efficiency. After it has passed through the radiators the heated fluid preferably reaches a second fluid store, which is heat insulated and is positioned, in the circuit, in series with the first fluid store. The fluid content of the second store progressively assumes a higher temperature, the areas of the fluid which are the last to assume this higher temperature being connected to the fluid store, arranged in the ground, by way of a downwardly directed guide loop. In this way there is realised a closed circuit system without heat being normally transferred from the second fluid store to the first fluid store. Only when all the fluid in the second fluid has, due to the excess heat, assumes a higher temperature is the remaining heat which is introduced transferred from the second fluid store into the first fluid store and is there delivered to the surrounding ground. The particular advantage of this arrangement resides in the fact that the conventional ventilation systems, together with their difficulties, are avoided. Furthermore, any desired temperature can be maintained in the greenhouse with very great accuracy, even when the effects of the natural heat (e.g. sun irradiation) rapidly changes. The existing radiators and pipe connections can be used for the circulation of the fluid. Above all, when required, the circulation can take place in the opposite direction for the purpose of, for example, heating the greenhouse to a lower prescribed temperature, which corresponds to the small amount of vegetation in the night (this takes place through the heat stored in the second fluid store being delivered to the greenhouse by way of the same fluid and the heating bodies. This simple circulatory system will usually be adequate for cooling and heating for long periods. When a higher degree of cooling takes place a conventional heating system, e.g. an oil burner or gas burner, can be brought into operation for heating the fluid in the circuit to the necessary higher temperature. The system is also preferably provided with a heat pump which can be switched on when required and which, when required, pumps the heated fluid from the second fluid store, before it reaches the radiators of the greenhouse, to a higher temperature. If the heat capacity of the second fluid store becomes exhausted, the first fluid store can, with advantage, be temporarily used as ground heat collected in conjunction with the heat pump. The cooling of a larder (pantry) and the cooling of dwelling spaces of a dwelling house can be integrated to an overall system which also allots to the fluid circuit a heat pump which uses all the excess heat removed from the pantry or from the dwelling spaces, although preferably it also uses the waste heat of the waste water points or units of the dwelling house, for the purpose of heating hot water storage tanks and their contents, these storage tanks serving for storing the hot water requirements points and/or the heating bodies in the heating periods.

Embodiments of the invention are described below with reference to the schematic drawings, in which.

In the case of the embodiments shown in FIGS. 1 to 3 and 5 to 7 it is to be assumed that the arrangement is incorporated in a single-family house. However, the arrangement can be correspondingly applied to flats in multi-family houses or blocks or flats.

Figure 1:
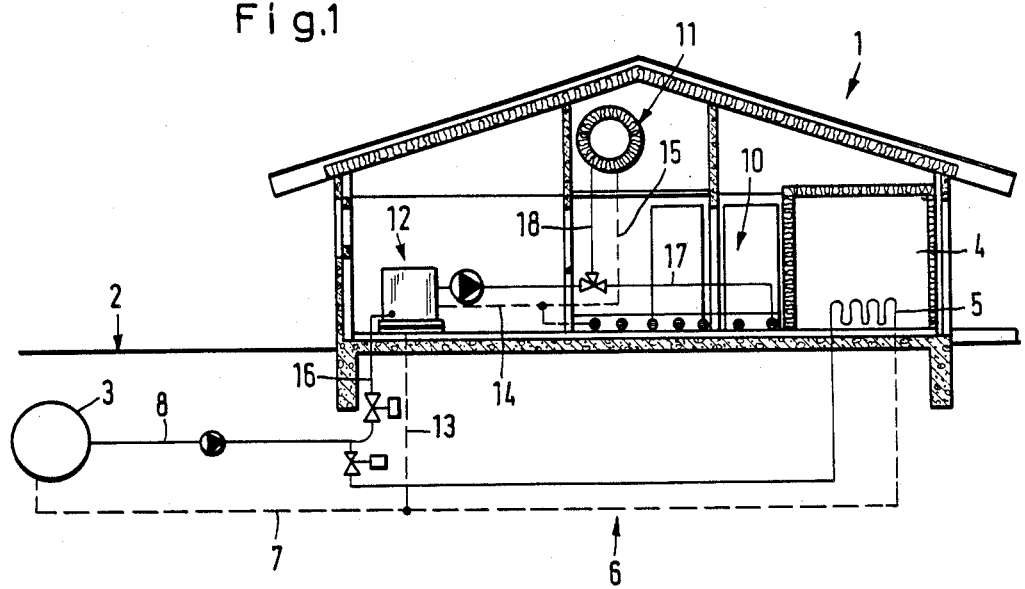
FIG. 1 is a simplified cross-sectional view of a single-family house, with an arrangement for carrying out the method according to the invention.

The single-family house 1, illustrated in FIG. 1, comprises an accessible cooling space 4, which serves for the storage of foodstuffs or the like. A compartment for cooled goods, which are easily accessible to the housewife, and which is exposed to the cooling effect in the cooling space 4, may be arranged, for example in a wall which is contiguous to the kitchen, behind a hinge-mounted swivellable plate or panel. The cooling space 4 does not have to be heat insulated, so that heat can penetrate through the walls from the outside.

A heat exchanger 5 in the form of one or more cooling coils is arranged in the cooling space 4. The heat exchanger 5 is connected, by way of a closed circulatory system 6, to a heat exchanger located a sufficient distance below the ground surface 2 and in direct heat exchanging relationship with the surrounding earth or ground, this latter mentioned heat exchanger also constituting a fluid store. A coiled tube could also be provided in the ground. The cooling tank 3 is preferably in the form of a ground (earth) tank. This tank 3 may be in the form of an elongate, horizontally positioned tank of a length between 6 and 12 m and of a diameter between 1 and 2 m. This cooling tank 3 is secured at a depth of 80 cm or more in the ground. Thermal contact of the casing of the cooling tank 3 with the surrounding ground may be increased by enlarging the surface of the casing, e.g. by means of ribs, vanes 246 (FIGS. 7 and 8) or the like.

Valves whose detailed construction is not illustrated, and also a circulating pump, arranged in the circulatory system 6 to 8, between the two heat exchangers 5 and 3; this circulating pump pumps a heat-bearing fluid, e.g. prepared water or some other liquid, in the circuit between the heat exchangers 3 and 5. Thus, heat which has been carried, or which has penetrated into the cooling space 4, is received by the heat exchanger 5 and is led by the fluid through the heat exchanger 3 and thence into the ground. In addition, a refrigerating unit or deep freeze unit 221 may be arranged in the cooling space 219 (FIG. 5), the part 222 of this refrigerating unit 221 which gives off heat being cooled by the circulating system 218, 230. The casing of the unit 221 can be used for additional cooling of the cooling space 219.

The circulatory system 6 to 8 (FIG. 1) or 218, 230 (FIG. 5) may also be used for cooling the occupied rooms or other spaces. For this purpose, it is preferable if use is made of the heating bodies or radiators 10, 39 (FIG. 3) or 205 (FIG. 5), which are in any case present in these living spaces or rooms. In the embodiment shown in FIG. 1 it is to be assumed that the living spaces comprise a tubular heating system 10, such as wall heating or floor heating. This tubular heating system can be connected, by way of suitably controllable valve devices and pipes 14, 17, to the circulatory system 6, so that the fluid which is kept circulating with drawing excess heat from the said occupied or living spaces by way of the tubes (or radiators). In contradistinction to the arrangement shown in FIG. 1 the pipes 14, 17 may also be directly connected, by way of valves, to the circulatory system 6, so that the fluid is led through the heating bodies by the same circulating pump. The radiators may, in addition, be provided with air circulation fans, which ensure adequate heat exchange between the air in the rooms or spaces and the radiator.

By means of suitable control devices and bridging ducts or flow constricting points in the circulatory system the temperature in the cooling space 4 may be adjusted, for example to a temperature between 4° and 8° C., and the temperature in the dwelling spaces to a temperature between, for example, +10° C. and the outside temperature prevailing at the time in question. Condensation of moisture in the spaces or rooms may be controlled, for example for the purpose of depositing dust or for the purpose of using the collected condensation water for controlling the humidity in the spaces or rooms.

In the embodiment illustrated a heat pump 12 can also be caused to cooperate, by way of pipes 13 and 16, with the fluid circulation system 6, so as to use, by means of the same fluid and by means of the same fluid circulating system, the heat obtained in the course of cooling chamber 4 or the ground (earth) heat stored in the cooling tank 3, and to heat the spaces by way of the same radiators or the like, and/or to produce hot water. As shown in FIG. 1, the heat pump 12 is connected, at the heat delivery side, to the heating bodies 10 and, by way of controllable valves and pipes 15 and 18, to one or more hot water storage tanks 11. A number of these storage tanks 11 for hot water is preferably provided, in small sizes; they can be connected, individually or in groups, to the heating or to the hot water consumption units of the house. When the hot water tanks 11 are located in the attic or loft, the heat which accumulates there can be additionally used for preheating purposes.

Cooling and air conditioning is also advantageous within the heat pump 12. The incorporation of a heat pump 12 enables the air conditioning for the spaces or rooms to be improved, through the provision of heating facilities, without at the same time entailing large additional energy and installation costs.

Figure 2:
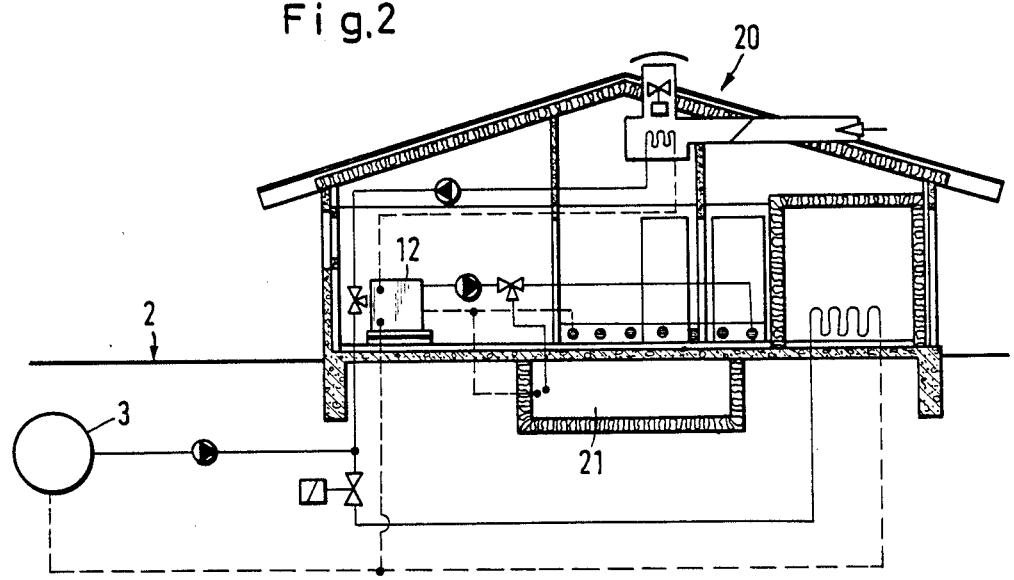
FIG. 2 is a similar view to that of FIG. 1, and illustrates a slightly modified embodiment.
Figure 3:
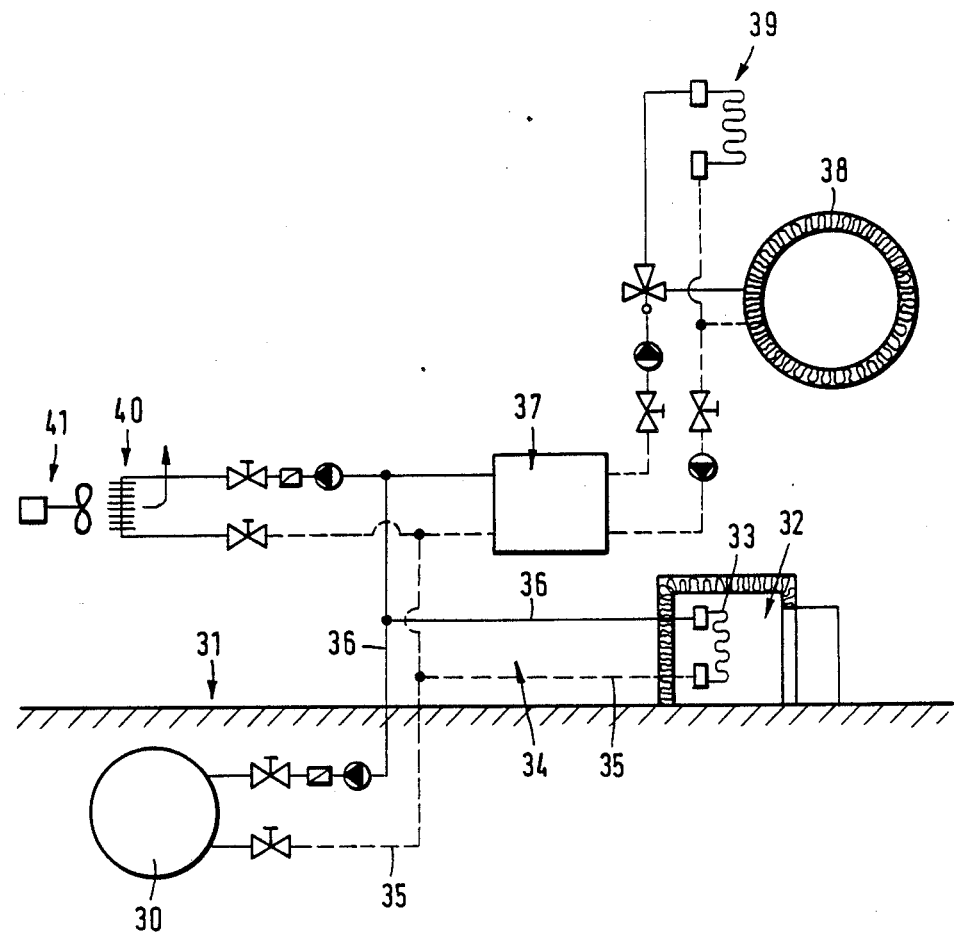
FIG. 3 is a schematic view of an arrangement for carrying out the method according to the invention.

In the case of the dwelling house 20 shown in FIG. 2 the hot water tank 21 is positioned in the cellar of the house, and hot air can additionally be fed to the heat pump from the roof of the dwelling house. This is also taken into account in the diagrammatic view of FIG. 3. In this embodiment a cooling tank 30 installed in the ground is connected, by way of pipes 35, 36 and a circulating pump, to the heat exchanger 33 in the cooling chamber 32. The heat receiving side of a heat pump 37 is connected to the fluid circulating system 34 and to the heat exchanger 40, which is supplied with air heat at 41. The heat delivery side of the heat pump 37 is connected to the hot water store 38 and to the room heating 39. The same heat bearing fluid guided in the circuit can be used for the whole system. Also, the pipes 35 and 36 can, for cooling purposes, be also directly connected, by way of controllable valves, to the space heating system 39. Also, the heat pump 37 can be used to ensure that the temperature in the cooling chamber 32 falls below the earth temperature through the heat pump 37 producing an additional cooling effect.

Figure 4:
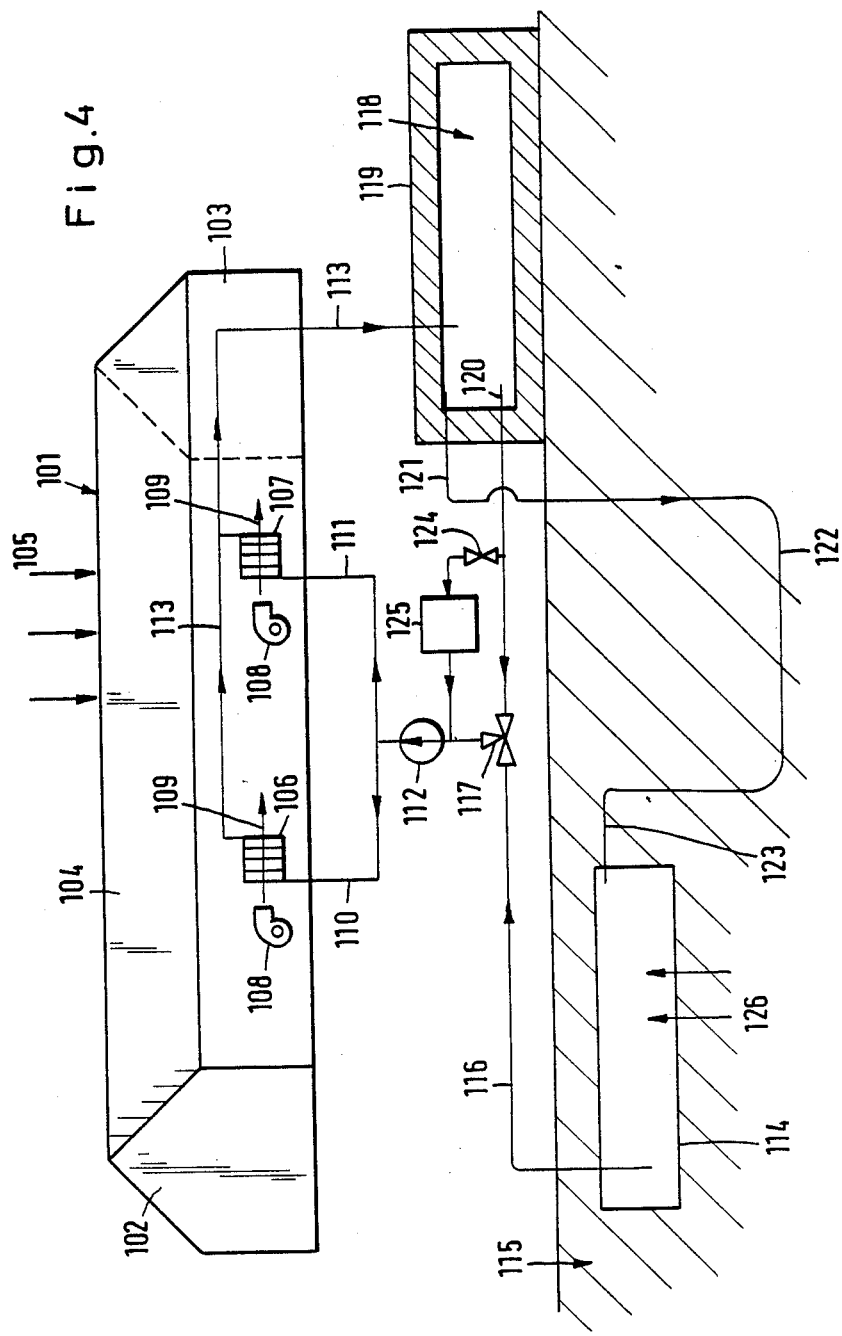
FIG. 4 illustrates an arrangement for carrying out the method according to the invention, for use in a conservatory or greenhouse.
Figure 5:
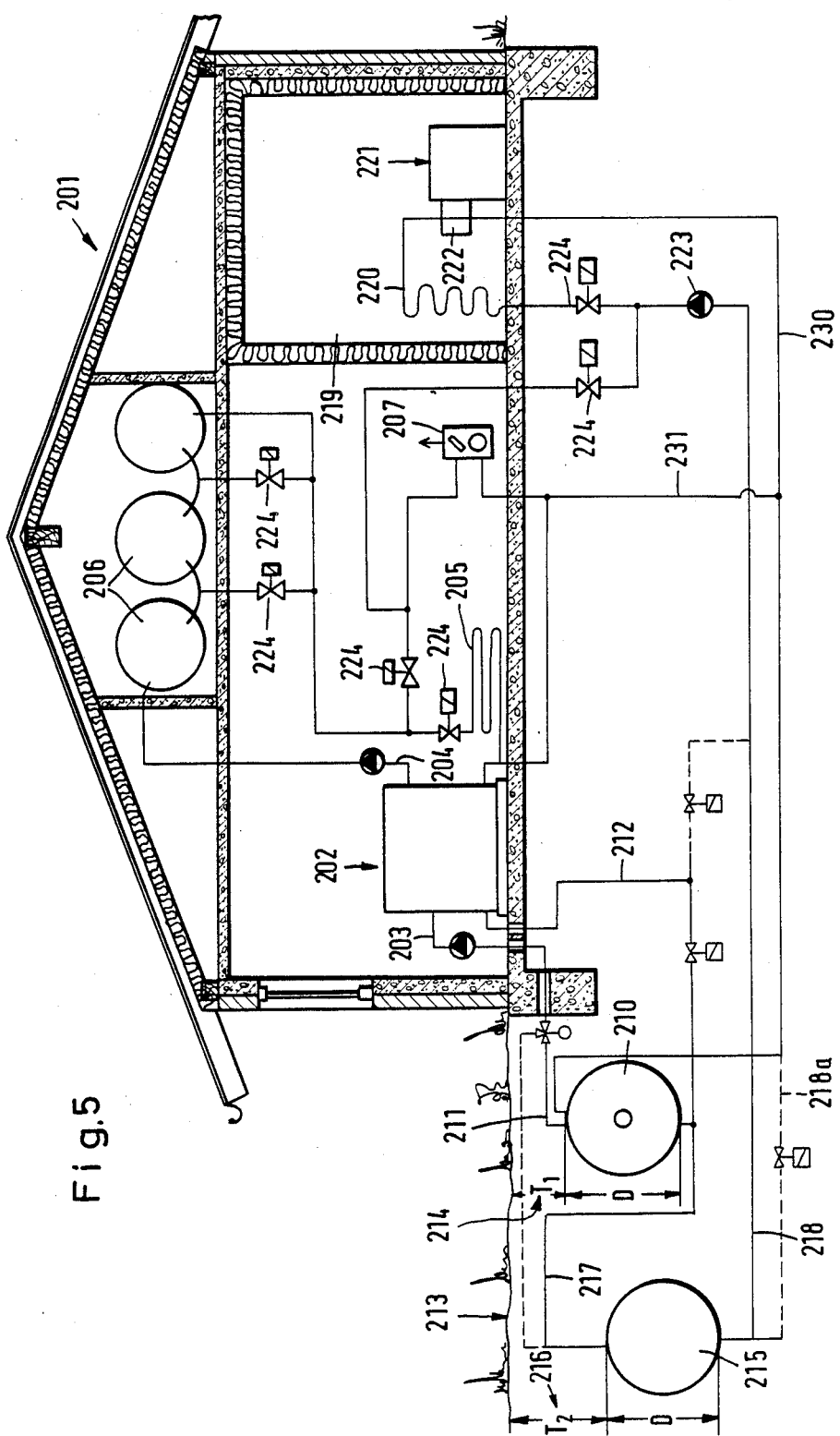
FIG. 5 illustrates another embodiment of the proposed novel arrangement for carrying out the method.

FIG. 4 illustrates the use of the invention for air conditioning a greenhouse 101 and roof surfaces 104 and end surfaces 102, 103 which, as arrows 105 indicate, are exposed to the heating effect of the outside atmosphere and of the sun. When the temperature conditions are reversed the greenhouse delivers heat to the outside atmosphere with similar ease.

Conventional radiators 106, 107 or similar heating bodies are provided in the greenhouse 101, fans 108 can be allotted to these radiators for increasing the heat transfer and thereby effecting a forced convection. In practice air is blown through vertically and not horizontally, as the arrows 109 suggest in FIG. 4.

The radiators are connected to the pipes 110,111 an 113 of a fluid circulation circuit. These radiators belong to a conventional heating system, such as is conventional in the case of greenhouses for supplying heating needs.

The excess heat produced in the greenhouse due to irradiation by the sun is removed, by way of the fluid circuit, reliably and subject to precise control. For this purpose there is provided a first fluid store 114 in the form of an elongate, horizontally disposed earth tank, which is secured, in the earth or ground 115, 80 cm or deeper below the ground surface. The earth tank 114 communicates, by way of pipe 116 and a control valve 117, with a pump 112 and with the radiators 106, 107. Thus, the fluid, which has been cooled, in the earth tank 114, to the average surrounding temperature of about 4° to 6° C. can be fed to the radiators 106, 107 as cooling liquid. There the fluid receives the excess heat from the greenhouse and passes, by way of pipe 113, to a second fluid store 118. This fluid store 118 is a tank 119 which lies above the ground surface, is elongated, horizontal and firmly insulated. The temperature of the fluid in the tank 119 is determined by the internal temperature of the greenhouse 101.

When heat is needed in the greenhouse, for example during the night, fluid can be sucked, by the reversible action pump 112, from the warmer fluid layers in the tank 119 so as to pass through pipe 120, multi-way valve 117 and, passing in opposite directions, through the pipes 110, 111, whence this fluid passes to the radiators 106, 107. As, in the case of many growths or plants cultivated in greenhouses, the daytime temperature must correspond to the more vigorous vegetation of the plants be higher than the night-time temperature, in many instances the heat accumulated during the daytime in the second fluid store 118 will suffice to maintain, by way of pump 112 and radiators 106, 107, the lower prescribed temperature required in the glasshouse during the night-time. The fluid which is thus cooled may be collected in a thrid tank. However, this cooled fluid may also be directly returned, through pipe 113, to the tank 119. The temperature in the tank 119 is in this way lowered. If this temperature reaches the lower prescribed value of the temperature in the greenhouse, the fluid can be additionally heated by a heat pump 125 which, when a specified temperature value of the fluid is reached, is switched into the fluid circuit by way of valve 124. The connecting pipes are shown in simplified form in FIG. 4, as the connections and the type and number of pipes for such purposes are known to those versed in the art. The heat pump 125 is only brought into operation, in the above described system, under exceptional circumstances.

The system is constituted as a closed circulatory system for the fluid. For this purpose the ares of the second fluid store 118 which remain cool for the longest time communicate with the first fluid store 114 by way of a downwardly offset pipe section or loop 121, 122. By way of this provision heat transference from the tank 119 to the tank 114 is prevented to a large degree. In the case of other spaces or rooms which are subject to increased heat irradiation (e.g. in the case of spaces with casings of anodised aluminium tiles or bricks, which lead to excessive heating of the space), it is possible to use the system, illustrated in FIG. 4, for the removal of excess heat and for storing and re-using this heat. In extreme cases a connecting pipe can also be arranged between the heat pump 125 and the ground (earth) tank 114, so that this tank 114, can when there is a high requirement for heat, be used as earth collector and, thus, for the supply of heat for the heat pump 125.

An additional oil heating system or other heating system can also be brought into operation, in which this system only has to heat the fluid by relatively small temperature differences, usually only a few degrees. Above all, this heating unit, which can be supplied with the same fluid, is used as an emergency unit.

A ventillation system can be used for controlling the gas content in the greenhouse 101; this ventilation system can at the same time serve as an emergency unit for cooling the greenhouse when excessive heat is evolved and when the above-described system becomes defective.

FIGS. 5 to 8 illustrate further embodiments of the arrangement according to the invention, applied to the air conditioning of a dwelling house 201. This dwelling house 201 comprises, in addition to the usual dwelling rooms and the rooms or spaces, a tiled pantry 219, in which a cooling coil 220 is connected, by way of the circulatory system 218a, 230 and the pipes 218, designated in dashed line, and the circulation pump 223 (with control valve 224) to a first fluid store 215. The pipes or ducts indicated by dashed lines enable the system to operate, in summer, as a pure cooling system.

The arrangement comprises a second fluid store in the form of a ground tank 210, which is elongate and can be connected in series with tank 215 in the closed fluid circulation system 230, e.g. by way of a pipe 217 which corresponds to the loop 122 (FIG. 4). The storage tank 210 is offset heightwise and horizontally with respect to the tank 215, as is indicated by the data concerning diameters and depths at 214 and 216 and by the horizontal distance.

The fluid heated in the cool space 219 is normally fed to the storage tank 210. Only when storage is not required for example in summer, can, the backflow be directly connected to the tank 215.

Figure 6:
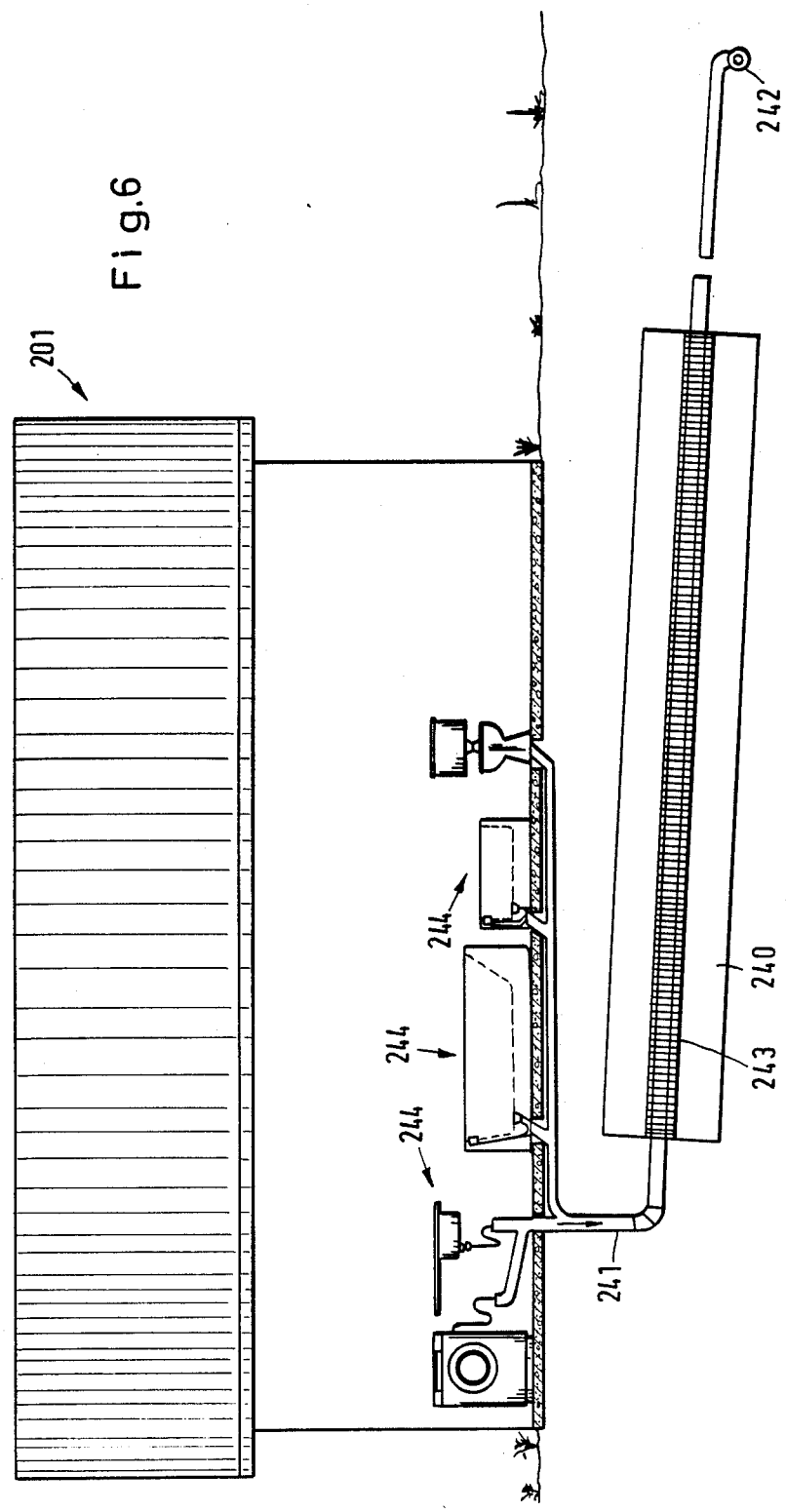
FIG. 6 is a side elevation of part of the arrangement shown in FIG. 5.

As shown in FIG. 6, the main part of the waste heat or excess heat, which would otherwise remain in the dwelling unit 201, is fed to the heat storage tank 210. Thus, the waste water from bath, toilet, washing machine, dishwasher and the like area—instead of being fed directly into, for example, the soakaway—collected in the pipe 241 and thus passed from there to a heat exchanger 243, which is associated with the heat storage tank 210. Heat exchanger 243 is constituted as a gravity tube provided with ribs and is directly positioned in the storage tank 210. Additional baffles, or devices for reducing the flow speed, may also be provided for the purpose of improving the thermal exchange. Also, less critical waste water can be guided, in horizontally inclined guides, through the storage tank 210. In each instance the waste water of all consuming units of the dwelling house is accumulated and brought into a state of thermal exchange with the fluid the heat thus yielded being stored in one or more storage tanks 210.

Figure 7:
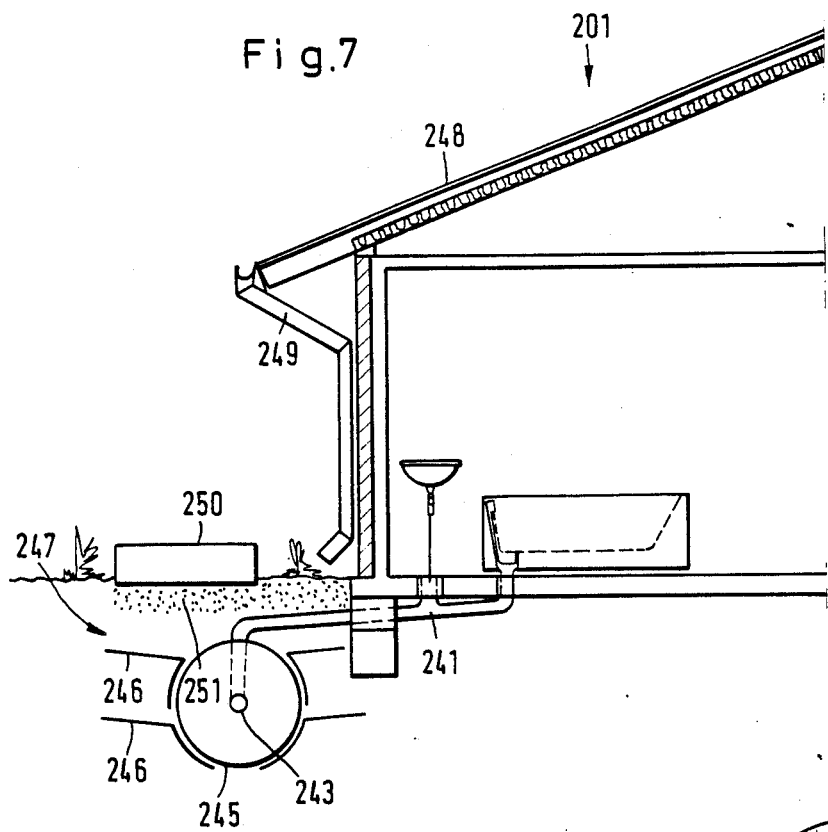
FIG. 7 is a partial cross-sectional view of a further modified arrangement (for carrying out the proposed method), with a heat storage tank.
Figure 8:
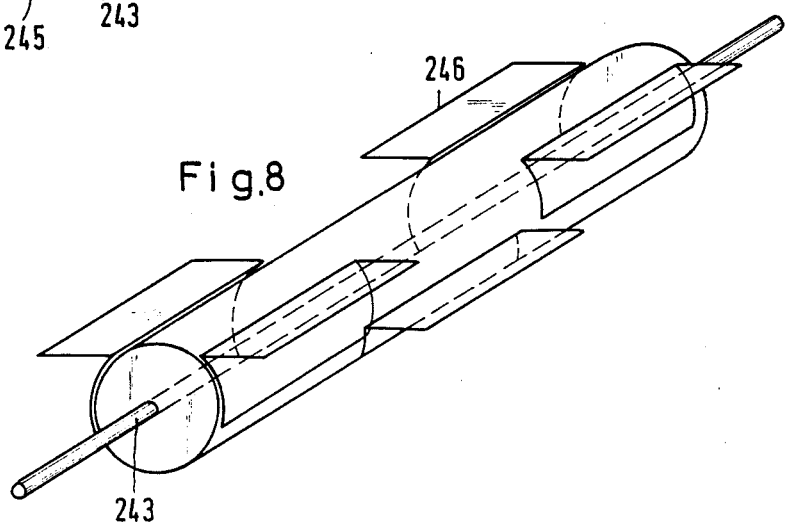
FIG. 8 is a perspective view of the storage tank of FIG. 7.

In this embodiment (FIG. 5) both fluid stores 210, 215 are in direct thermal contact with the surrounding ground area. The cooling tank 215 is used for making the cool earth temperature available for cooling purposes and air conditioning purposes, while the storage tank 210 is used, when needed for additionally receiving the ground heat from the surrounding area and making this heat available for heating purposes. As is well known, thermal conductivity of the earth depends on the moisture in the earth. As FIG. 7 shows, it is possible—with the assistance of the rain water collected on the roof surface 248 and on the collecting system 249 and controlled by way of a schematically indicated storage and control device 250—to adjust the ground moisture in the vicinity of the storage tank 210 or 245 (FIG. 7). If heat is to be mainly stored in the tank it will be necessary to keep the ground area 247 as dry as possible. If, however, ground heat is to be collected and removed for heating purposes, the heat conductivity of the ground area will be increased through allowing water to enter the ground area, as is indicated at 251.

The heat receiving side of heat pump 202 is connected, by way of pipes 203, 212, to the storage tank 210, the heat delivering side of the pump 202 being connected to hot water storage tanks 206, which can be connected, through valves 224, either to hot water extraction points or to the pipes or radiators of a heating system 205. In the embodiment illustrated two heating systems, viz. ground heating system 205 and radiators 207 are indicated. Both of these systems can be separately fed, although then can also operate in mutual parallel.

The tanks may consist of plastics material or steel, or of centrifugally cast metal, the selection of the particular material used will depend on the required heat conductivity and on the service life in conjunction with the acceptable costs.

In all instances the arrangement can be universally employed for cooling, air conditioning, and for heating; in a large measure the same system can be used for all purposes, and practically all excess or waste heat can be re-used. The arrangement is extremely simple and can be installed even in restricted space conditions. The arrangement also allows the air moisture to be controlled in a simple way.

Naturally, it is also possible to combine to a single unit such a system for dwelling purposes with a system for commercial purposes, such as a horticultural system, whereby a further saving in costs and a yet further improved utilisation of the heat present in the system will be ensured. Additional heat sources, in particular solar collector panels, will in the great majority of cases not be required for this system. This is advantageous, as such additional heat sources are costly and are also very unreliable in respect of the useful heat yield.

The fluid store, which is intended for the cooling fluid, can, with advantage, also be constituted as an elongate tank, whose longitudinal axis extends vertically into the ground or earth. In this way it is possible to realise a space-saving and economical installation, which may possibly be subsequently replacable.

It will be particularly advantageous if the vertically installed tank at the same time receives both the first fluid store for the cooling fluid and also the second fluid store for the storage of heat, so that only one tank is needed instead of, as has hitherto been the case, two tanks for the two fluid stores.

When one tank is used for the two fluid stores the lower area of the tank will be used for the extraction of the cooling fluid while the upper area will be used as heat store. Thus, this upper area receives the heated fluid and, conveniently, may be thermally insulated with repect to the ground (earth). The use of one tank for the two fluid stores is rendered possible by the pronounced heat stratification within the tank. For removing the cooling fluid the discharge pipe may be led through the inside of the tank to a point close to the tank bottom, the extraction pipe being, conveniently, firmly insulated. Due to the tank length, for example a length of 6 m, it can be expected, in the majority of installation examples, that the lower tank end will lie in the ground water area, which appreciably improves thermal transfer. The tank may, conveniently, consist of synthetic plastic material.

At these installation depths freezing of the fluid in the tank is not to be feared. An anti-freeze substance or rust inhibitor will therefore not be needed. In instances where a heat pump is inserted into the fluid circuit, the negative effect of the latent cold, when the heat pump is switched off, and the danger, arising from this, of freezing taking place can be easily eliminating by allotting a delay device to the drive of the circulation pump, this delay device allowing, when the heat pump is switched off, the circulation pump to continue to function for a predetermined period of time, so that the latent cold in the area of the heat pump is reliably removed and any danger to the ducting system disappears.

If it is desired to use the waste from the waste water of a dwelling house in this connection, this can be carried out, in the circuit, by way of a separate heat exchanger.

The installation of the vertically positioned tank can take place, in the manner adopted in well construction, by the successive lowering of well rings which support the well pit, until the tank has been installed. In this way also the subsequent installation of the ground tank is appreciably facilitated. Also, in the case of a subsequently effected installation, the disturbing engagement in the surface structures on the ground is restricted to a minimum.

I claim:

1. An arrangement for utilizing the heat contained in the ground for heat consuming devices in conditioned rooms or the like wherein heat exchangers in the rooms are adapted to radiate or absorb heat and being connected alternatively and by way of a flow circulating system for a flow transfer fluid either to the heat giving side of a heat pump or to a heat exchanger which is in direct heat exchange with the surrounding ground and preferably also with the domestic waste water and wherein the heat exchanger arranged in the ground is connected alternatively and by way of a circulating system for the heat transfer fluid either to the heat absorbing side of the heat pump or to the heat exchangers in the rooms, characterized in that there are provided two heat exchangers in direct heat exchange with the surrounding ground and each in the form of an earth tank, one of which forming a cooling tank and being arranged in groundlayers of nearly constant temperature and for cooling purposes being connected by means of a recycling pump in series to the heat exchanger and to the warm layer region of the other tank the cold layer region of which is constantly connected to the cooling tank, and for heating purposes the warm layer region of said other tank is connected in series to the heat absorbing side of the heat pump and to the cooling tank, and in which the regions of the ground in which the two tanks are positioned are not in direct heat exchange contact.

2. Arrangement according to claim 1 wherein each tank is provided with vane-like heat transfering elements which extend into the surrounding ground.

3. An arrangement according to claim 1, characterized in that a rain water collector device, a seepage device, and a control device are provided, by means of which, in order to stop the heat insulation of the ground surrounding the second tank when desired, rain water may be introduced into this ground.

4. An arrangement according to claim 2, characterized in that the second tank has a heat exchanger which is connected to the outlet of domestic wate water.

5. An arrangement according to claim 1, characterized in that a single elongated tank with its longitudinal axis directed vertically is installed in the ground and whose lower region as the first tank and whose upper heat-insulated region as the second tank may be connected to the circulatory system.

6. An arrangement according to claim 1, characterized in that the cold layer region of the first tank is permanently connected directly to a heat exchanger of a cooling space which is of such dimensions that a person may walk in, which heat exchanger is used for cooling and is directly connected to the warm layer region of the second tank disposed downstream in the direction of flow, so as to form a closed circuit.

* * * * *